United States Patent [19]
Lambert

[11] Patent Number: 5,962,748
[45] Date of Patent: Oct. 5, 1999

[54] PROCESS FOR PREPARING LOW UNSATURATION POLYETHER POLYOLS

[75] Inventor: Timothy L. Lambert, Austin, Tex.

[73] Assignee: Huntsman Petrochemical Corporation, Austin, Tex.

[21] Appl. No.: 08/956,960

[22] Filed: Oct. 23, 1997

Related U.S. Application Data

[60] Division of application No. 08/743,366, Nov. 4, 1996, Pat. No. 5,698,746, which is a continuation-in-part of application No. 08/489,403, Jun. 12, 1995, abandoned.

[51] Int. Cl.$^6$ .................................................. C07C 41/44
[52] U.S. Cl. ........................ 568/618; 568/619; 568/620; 568/621; 568/623
[58] Field of Search .................................. 568/618, 619, 568/620, 621, 623

[56] References Cited

U.S. PATENT DOCUMENTS

| | | | |
|---|---|---|---|
| 2,996,550 | 8/1961 | Simons | 568/621 |
| 3,117,998 | 1/1964 | Cosby et al. | 260/584 |
| 4,029,879 | 6/1977 | Muzzio | 536/4 |
| 5,010,187 | 4/1991 | Heuvelsland | 536/120 |
| 5,070,125 | 12/1991 | Heuvelsland | 124/155 |
| 5,095,061 | 3/1992 | Chavez, Jr. et al. | 524/376 |
| 5,102,428 | 4/1992 | Owen et al. | 44/448 |
| 5,103,042 | 4/1992 | Duravasula | 560/189 |
| 5,288,924 | 2/1994 | Beech, Jr. et al. | 568/695 |
| 5,342,541 | 8/1994 | Chavez, Jr. et al. | 252/182.27 |

FOREIGN PATENT DOCUMENTS

| | | |
|---|---|---|
| 0195910 | 10/1986 | European Pat. Off. . |
| 0408201 | 1/1991 | European Pat. Off. . |
| 0466150 | 1/1992 | European Pat. Off. . |
| 9011990 | 10/1990 | WIPO . |
| 9103449 | 3/1991 | WIPO . |

OTHER PUBLICATIONS

G. J. Dege, et al., "Terminal Unsaturation in Polypropylene Glycol," *J. Am. Chem. Soc.*, vol. 81, pp. 3374–3379 (1959).

H. U. Schimpfle, et al., "Structure of Polyether Alcohols: Determination of Molar Functionality Distribution," *Acta Polymerica*, vol. 32, No. 1, 1981, pp. 55–57. (Translation).

A. Stolarzewicz, et al., "Zur Übertragungsreaktion bei der Anionschen Polymerisation von Oxiranen I. Zum Einfluss des Initiatorsystems auf die Kettenübertragung," *Acta Polymerica*, vol. 32, No. 8, 1981, pp. 483–486. (and translation).

H. Becker, et al., "Zur Übertragungsreaktion bei der Anionschen Polymerisation von Oxiranen II. Zum von Kronenetherzxusätzen auf die Polymerisation von Propylenoxid," *Acta Polymerica*, vol. 32, No. 12, 1981, pp. 764–766. (and translation).

H. Becker, et al., "Zur Übertragungsreaktion bei der Anionschen Polmerisation von Oxiranen III. Dynamik der Doppelbindungsbildung bei der Propylenoxidpolymerisation," *Acta Polymerica*, vol. 33, No. 1, 1982, pp. 34–37. (and translation).

H. Becker, et al., "Zur Übertragungsreaktion bei der Anionschen Polmerisation von Oxiranen IV. Zum Einfluss von Kronenetherzusätzen auf die Polmerisation von Propylenoxid," *Acta Polymerica*, vol. 35, No. 1, 1984, pp. 28–32. (and translation).

J. Ding, et al., "Use of Crown Ether in the Anionic Polymerization of Propylene Oxide—2. Molecular Weight and Molecular Weight Distribution," *Eur. Polym. J.*, vol. 27, No. 9, 1991, pp. 895–899.

Derwent Abstract A25 94–001294/01 to EP 576132–A1.

N. Barksby, "Optimizing Properties of Urethane Sealants," *Adhesives & Sealants Industry*, Jun./Jul., 1994, pp. 38–42.

*Primary Examiner*—Donald R. Wilson
*Attorney, Agent, or Firm*—Madan & Morris

[57] ABSTRACT

Polyether polyols having reduced terminal unsaturation are prepared in a process comprising a first step comprising reacting propylene oxide with an initiator having at least two hydroxyl groups in the presence of a basic catalyst, a second step of contacting the polyether product of the first step having allyl terminal unsaturation with an isomerization catalyst whereby the allyl terminal unsaturation of the polyether is reduced by at least 90% conversion to propenyl terminal unsaturation in one step and, in a final step, the resulting polyether product of the first step is contacted with an acid catalyst whereby a substantial amount of the propenyl terminal unsaturation of the polyether is removed and the corresponding polyether having an additional hydroxyl group is obtained.

11 Claims, 1 Drawing Sheet

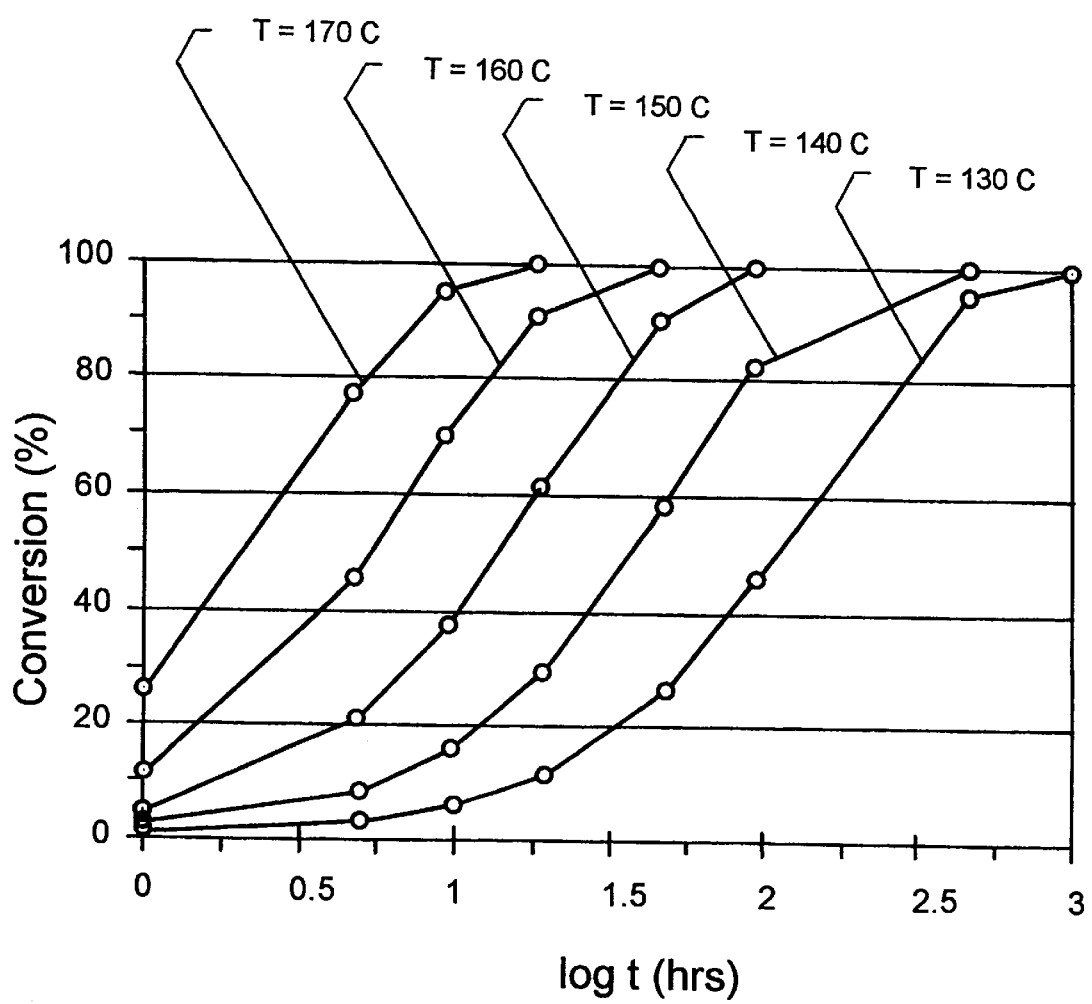

PROCESS FOR PREPARING LOW UNSATURATION POLYETHER POLYOLS

This is a divisional of application Ser. No. 08/743,366 filed on Nov. 4, 1996, now U.S. Pat. No. 5,698,746, which is in turn a continuation-in-part application of Ser. No. 08/489,403 filed on Jun. 12, 1995, now abandoned.

BACKGROUND OF THE INVENTION

1. Field of the Invention

This invention relates to a process for preparing low unsaturation polyether polyols. More particularly, this invention relates to a process for the preparation of polyether polyols, such as polyoxypropylene glycols, having reduced levels of terminal unsaturation.

In the process of this invention allyl terminal unsaturation of a polyether in a first step is reduced by conversion to propenyl unsaturation by contacting the polyether with an isomerization catalyst after which a substantial amount of the propenyl terminal unsaturation is removed by contacting the polyether with an acid catalyst and the corresponding polyether having an additional hydroxyl group is obtained.

During the preparation of polyethers, such as polyoxypropylene glycols, with molecular weights greater than about 1000, monofunctional products having allyl ether terminal ($CH_2$=CH—$CH_2$—O—) groups are formed as a result of the base catalyzed rearrangement of propylene oxide to allyl alcohol and subsequent propoxylation of the allyl alcohol.

The problem of the rearrangement or conversion of propylene oxide to allyl alcohol increases substantially as the molecular weight of the polyoxypropylene glycol product increases. Thus, the problem of the formation of the monofunctional products, which is quite small in low molecular weight polyols, increases significantly as the molecular weight increases to 1000 or more.

It is typical for commercial polyoxypropylene glycol products prepared conventionally using basic catalysts, such as potassium hydroxide, to have unsaturated terminal groups in the range of about 3–4 mol percent of the total number of the terminal groups. These products having unsaturated terminal groups are undesirable for use in the preparation of polyurethanes since the unsaturated terminal groups which are unreactive toward isocyanates not only limit the molecular weight of the urethane product but, additionally, may cause deleterious physical property effects on the end product if the concentration of the unsaturated terminal groups is too high. Further, during the amination of the polyoxyalkylene glycols to form amine terminated polyols, the unsaturated terminal group is hydrogenated to a propyl group which is also unreactive toward isocyanates and may affect adversely the physical properties of the resulting polymer product. It is therefore desirable to prepare polyols with lowered levels of unsaturation to be used in preparing polyurethanes and amine terminated polyols with improved properties.

2. Prior Art

U.S. Pat. No. 5,010,187 to Heuvelsland teaches a process for preparing a polyester polyol having an equivalent weight of from about 200 to about 5000 by reacting propylene oxide with an initiator containing at least two active hydrogens in the presence of a catalyst such as barium, strontium and their oxides, hydroxides, hydrated hydroxides or monohydroxide salts or mixtures thereof. The prepared polyol has a total unsaturation level of less than 0.080 millequivalents/gram polyol.

U.S. Pat. No. 5,095,061 to Chavez, Jr., et al., teaches a process for reducing the amount of propenyl polyethers in hydroxy-functional polyethers which comprise contacting a neutral hydroxy-functional polyether containing a propenyl polyether and water and an acid catalyst soluble in the polyether, such as hydrochloric, sulfuric, phosphoric, etc., under reaction conditions sufficient to convert a portion of the propenyl polyether to propionaldehyde followed by scavenging the acid with an epoxy compound and finally removing the epoxy compound and the propionaldehyde.

U.S. Pat. No. 5,103,042 to Durvasula teaches a method for reducing unsaturation in polyethers in which a polyether having at least a hydroxyl group and allyl terminal unsaturation is contacted with an allyl complex-forming catalyst, such as palladium and a hydrogen donor, such as ammonium formate, at a temperature below that at which significant decomposition of the polyether occurs whereby a measurable portion of the allyl terminal unsaturation of the polyol is removed and the corresponding polyether having an additional hydroxyl group is obtained.

Derwent Abstract A25 94-001294/01 to EP 576132-A1 discloses a process for reducing the level of unsaturation in polyoxyalkylene polyols by extracting with an immiscible low molecular weight polyol (i.e., less than 500) such as ethylene glycol, diethylene glycol, triethylene glycol, glycerol and butanediol, etc. The extraction may be carried out continuously or repeatedly (2–10 times) batchwise. The purified polyol products have superior properties to those made from untreated polyols.

SUMMARY OF THE INVENTION

In one aspect this invention relates to a process for preparing a polyether having reduced terminal unsaturation comprising (1) contacting a polyether having at least one hydroxyl group and allyl terminal unsaturation with an isomerization catalyst, such as cesium, sodium or potassium hydroxide, or a ruthenium compound such as ruthenium (III) chloride, whereby the allyl terminal unsaturation of the polyether is reduced by conversion to propenyl terminal unsaturation, (2) removing the catalyst from the polyether product of step (1), and (3) contacting the polyether product of step (2) with an acid catalyst, such as acidic zeolite, whereby a substantial amount of the propenyl terminal unsaturation is removed and converted to propionaldehyde and the corresponding polyether having an additional hydroxyl group is obtained.

In a second aspect, this invention relates to a process for preparing a polyether polyol, such as a polyoxypropylene glycol having reduced terminal unsaturation comprising (1) reacting propylene oxide with an initiator having at least two hydroxyl groups in the presence of a basic catalyst, such as potassium hydroxide, at a temperature of about 90 to 150° C., at least a portion of the resulting polyether polyol being characterized by having allyl terminal unsaturation, (2) heating the polyether polyol of step (1) containing the basic catalyst at a temperature of about 110 to about 190° C., whereby the allyl terminal unsaturation is reduced by conversion to propenyl terminal unsaturation. In step (3), the catalyst is removed from the polyether product by any convenient method, such as by treatment with magnesium silicate followed by filtration. In a final step, the polyether polyol is contacted with an acidic zeolite whereby a substantial amount, i.e., about 60 to 100 percent, of the propenyl terminal unsaturation is removed.

In a third aspect, this invention relates to a process for preparing a polyether having reduced terminal unsaturation such as polyoxypropylene glycol comprising heating a mixture containing a polyether having at least one hydroxyl group and allyl terminal unsaturation and an isomerization catalyst, such as potassium hydroxide, whereby the allyl terminal unsaturation of the polyether is reduced by conversion to propenyl terminal unsaturation after which a substantial amount of the propenyl terminal unsaturation is removed by contacting the catalyst-free polyether with an acidic zeolite.

In a fourth aspect, this invention relates to a one-step process for preparing a polyether having reduced terminal unsaturation comprising contacting a polyether, having at least one hydroxyl group and allyl terminal unsaturation with a catalyst comprising a ruthenium compound, such as ruthenium (III) chloride, supported on silica gel whereby a polyether essentially free of terminal unsaturation is produced.

In a fifth aspect, this invention relates to an in-situ process for preparing a polyether polyol having an average molecular weight of about 1000 to about 5000 comprising reacting propylene oxide in the presence of a ruthenium catalyst with an initiator having at least two active hydrogens, such as a polyoxypropylene glycol having a molecular weight of about 400, and containing about 0.5 to about 10 weight percent of a basic catalyst, such as potassium hydroxide, based on the weight of the initiator whereby a polyether polyol free of terminal unsaturation is obtained.

DESCRIPTION OF THE FIGURE

FIG. 1 is a chart showing conversion of allylic termination to propenyl termination as a function of time for various reaction temperatures using 0.058 M KOH catalyst per liter. The initial allylic termination is 3 mole percent of the total end groups.

DETAILED DESCRIPTION OF THE INVENTION

For convenience in the description of the process of this invention unsaturation in the polyethers provided by $CH_2=CH-CH_2-$ terminal group is referred to as "allyl" unsaturation whereas unsaturation provided by a $CH_3-CH=CH-$ terminal group is referred to as "propenyl" unsaturation.

This invention is suitable for reducing terminal unsaturation in a wide variety of polyethers. These include, for example, polyether polyols as exemplified by polyoxyalkylene glycols, etc. Such polyethers are produced by methods well known in the art. Typically, the polyethers are prepared by reacting an alcohol, preferably a polyhydric alcohol having about two to about eight hydroxyl groups, amine groups or other active hydrogen sites with one or more alkylene oxides.

In addition to terminal unsaturation, polyethers suitable for use in the process of this invention contain at least one hydroxyl group so that on removal of the terminal unsaturation a molecule having at least two hydroxyl groups per molecule is obtained.

The polyether suitable for use in this invention is advantageously a product prepared with an alkylene oxide which is susceptible to conversion to the corresponding alcohol. In such case, the terminal unsaturation at least in part is derived from such conversion and the subsequent reaction of the alkylene oxide with the thus-formed alcohol. Propylene oxide is by far the alkylene oxide most susceptible to such conversion. Accordingly, the preferred polyether is one produced by reaction of propylene oxide or a mixture of propylene oxide and another alkylene oxide such as ethylene oxide with a suitable initiator in the presence of a basic catalyst, such as potassium hydroxide, in which the oxypropylene units derived from propylene oxide constitute at least about 50 percent and preferably at least 65 to 85 percent by weight of the polyether. Polyethers produced by the sequential addition of ethylene oxide followed by propylene oxide are also useful in the processes of this invention.

Preferably, the polyethers are prepared from alkylene oxides having from about two to about six carbon atoms such as ethylene oxide, propylene oxide, butylene oxide and mixtures thereof.

Illustrative alcohols suitable for initiating formation of a polyalkylene polyether include glycerine; ethylene glycol; 1,3-propylene glycol; dipropylene glycol; 1,2-propylene glycol; 1,4-butylene glycol; 1,3-butylene glycol; 1,2-butylene glycol; 1,5-pentane diol; 1,7-heptane diol; glycerol; 1,1,1-trimethylolpropane; 1,1,1-trimethylolethane; hexane-1,2,6-triol; alpha-methyl glycoside; pentaerythritol; erythritol and sorbitol, as well as pentols and hexols. Sugars such as glucose, sucrose, fructose, maltose and the like and compounds derived from phenols such as (4,4'-hydroxyphenyl)2,2-propane; bisphenols; and the like are also suitable for forming polyether polyols useful in the practice of the invention.

Amines suitable for reaction with alkylene oxides to form polyethers, include aliphatic and aromatic mono- and polyamines, optionally having substituents such as alkyl, carboxyl, carboalkoxy groups and the like. Exemplary aromatic amines include aniline, o-chloro-aniline, p-phenylene diamine, 1,5-diaminonaphthalene, methylene dianiline, the condensation products of aniline and formaldehyde, 2,4-diamino toluene, ethylene diamine, toluene diamine and the like. Exemplary aliphatic amines include methylamine, triisopropanolamine, isopropanolamine, diethanolamine, triethanolamine, ethylenediamine, 1,3-propylenediamine, 1,4-propylenediamine, 1,4-butylenediamine, mixtures thereof and the like.

Because the problem of alkylene oxide rearrangement becomes increasingly prevalent with increasing equivalent weight of the polyether, the process of this invention is of particular significance when the polyether has an average molecular weight of at least about 1000. The useful polyethers have an average of from about 1 to about 8, preferably from about 2 to about 4, hydroxyl groups per molecule. The polyethers are preferably of relatively high molecular weight, having molecular weights ranging up to about 10,000 preferably about 1000 to about 8000. Especially preferred polyethers are polyoxypropylene glycols. The polyoxypropylene glycols may contain oxyethylene units. Polyethers having molecular weights of from 1000 to about 8000 are generally most preferred for preparing polyurethanes.

One or more catalysts are advantageously used in the preparation of the useful polyethers. Preferred catalysts include basic catalysts, more preferably hydroxides and alkoxides of alkali and alkaline earth metals, particularly cesium, sodium, potassium and lithium. When alkoxides are used as catalysts, the alkoxy groups advantageously contain from about one to about 36 carbon atoms.

Conversion of Allyl Terminal Unsaturation of the Polyethers to Propenyl Unsaturation A wide variety of isomerization catalysts may be employed in the process of this invention for converting the allyl terminal unsaturation of the starting polyether to propenyl unsaturation. One group of preferred isomerization catalysts includes basic catalysts as exemplified by alkali metal hydroxides, particularly cesium, sodium and potassium hydroxides. Other useful basic isomerization catalysts include, for example, potassium fluoride on alumina, magnesium oxide and hydrotalcite, such as KW-2000, a calcined synthetic hydrotalcite available from Kyowa Chemical Industry Co., Ltd. of Japan. Hydrotalcite KW-2000 has the formula:

$$Mg_{0.7}Al_{0.3}O_{0.85}$$

Transition metal compounds useful as isomerization catalysts include, for example, ruthenium (III) chloride, tris(triphenylphosphine) ruthenium (II) chloride, tris(triphenylphosphine) rhodium (1) chloride, ruthenium oxide hydrate, etc.

Sufficient catalyst is employed in this step of the process to provide for the conversion of a substantial amount, i.e., about 25 up to 100 percent, of the allyl terminal unsaturation to propenyl terminal unsaturation. The catalysts concentration employed is such that the reaction proceeds to the desired degree of completion in about 24 hours or less, preferably in about 8 hours or less. In general suitable amounts of the isomerization catalyst will range from about 0.10 to about 15, preferably about 0.10 to about 10 weight percent of catalyst based on the weight of the polyether.

The isomerization process of this invention is conducted at a temperature sufficient to achieve a convenient reaction rate. Generally the reaction temperature will range from about 80 to about 180° C. with the preferred temperature being from 120 to about 170° C. Preferably, the isomerization reaction is conducted in a closed system at pressures of 0 to about 90 psig.

Diluents or solvents may be employed in the isomerization step where the polyether is, for example, a viscous material or to improve heat transfer. Useful solvents or diluents include methanol, ethanol, propanol, dioxane, tetrahydrofuran, etc. Preferably, the amount of solvent will range from about 1 to 10 times the weight of the polyether.

At the conclusion of the isomerization step the catalyst is removed from the polyether product having propenyl unsaturation, by any convenient physical method such as by liquid/liquid extraction, with adsorbents such as magnesium silicate, etc., or by filtration, centrifugation, decantation, etc., in the case of solid catalysts.

The isomerization step can be carried out batchwise or in continuous manner. For example, the polyether with a diluent or solvent, if utilized, can be continuously passed over a catalyst bed composed of a solid or supported catalyst.

Removal of Propenyl Terminal Unsaturation

In the process of this invention the polyether product having propenyl terminal unsaturation recovered from the isomerization step as described above is contacted with an acid catalyst whereby a substantial amount, i.e., about 60 to 100 percent, of the propenyl terminal unsaturation, is removed and converted to propionaldehyde and the corresponding polyether having an additional hydroxyl group is obtained. In some cases the addition of water may be desired.

Suitable acid catalysts for use in the propenyl terminal unsaturation removal step of the process of this invention include solid acid catalysts as exemplified by zeolites, silica gel, Lewis acids, Bronsted acids, acidic clays, and aluminum phosphate.

Useful zeolites include acid zeolites especially those of moderate acidity having silica to alumina ratios of about 5:1 to about 100:1. Examples of suitable acid zeolites include Valfor® CBV 901-X16 Y zeolite and Valfor® CBV 780-X16 Y zeolite of the PQ Corp.

Acid catalysts of the Lewis acid type useful in this process include, for example, Group IIIA metal salts.

In this step of the process sufficient catalyst is utilized to provide for the removal of a substantial amount of the propenyl terminal unsaturation of the polyether in a reasonable time. Generally, the amount of the catalyst utilized is such that the desired degree of completion of the reaction is achieved in about 0.5 to about 24 hours. Usually about 0.2 to about 25 weight percent of the catalyst, based on the weight of the polyether product being treated, is used.

The reaction in this step in which the propenyl terminal unsaturation groups are removed from the polyether and converted to propionaldehyde and where simultaneously the corresponding polyether having an additional hydroxyl group results may, in some cases, be carried out in the presence of water. The amount of water employed may be varied over a wide range however, in one embodiment water may be present in at least a stoichiometric amount based on the amount of the propenyl terminal unsaturation removed from the polyether.

In this step the process is conducted at a temperature high enough to achieve a suitable reaction rate while at the same time avoiding any significant decomposition of the polyether. Usually the temperature employed will range from about 25 to about 180° C., preferably about 60 to about 120° C.

Solvents or diluents may be used in the process where the polyether is a viscous material or to improve heat transfer. Suitable solvents include methanol, ethanol, propanol, etc., with the amount employed being from about 1 to about 10 times the weight of the polyether.

The propenyl unsaturation removal step can be conducted batchwise or in a continuous manner. For example, the polyether together with the diluent or solvent, if employed, can be continuously passed through a column packed with a supported or solid catalyst in order to conduct the reaction.

As previously pointed out, this invention also relates to a process for preparing low unsaturation polyether polyols in which propylene oxide is reacted in the presence of a catalyst, such as cesium, sodium or potassium hydroxide, with an initiator, such as a polyoxypropylene glycol having a molecular weight of about 200 to 1000 preferably 220 to 600 or more, to form a polyether polyol product having a molecular weight of about 1000 to about 5000. The resulting polyether product characterized by allyl terminal unsaturation and containing the catalyst is then heated at a temperature of about 110 to about 190° C. for about 0.5 to about 24 hours whereby the allyl terminal unsaturation is reduced by conversion to propenyl terminal unsaturation. After removal of the catalyst by treatment with, for example, magnesium silicate followed by filtration, the polyol product is contacted with an acidic zeolite in the manner previously described to effect removal of a substantial amount of the propenyl terminal unsaturation.

Useful basic catalysts include cesium, sodium and potassium hydroxides. The amount of the basic catalyst which in this process also serves as the isomerization catalyst generally will range from about 0.5 to about 10 wt. percent based on the weight of the initiator compound.

Initiators suitable for use in the above described process generally will have molecular weights ranging from 18 to about 1000. Preferred initiators include ethylene glycol; 1,2-propylene glycol; 1,3-propylene glycol; the various isomers of butylene glycol, pentylene glycol, glycerine, trimethylolpropane, pentaerythritol, ethylenediamine and the polyoxyalkylene adducts thereof.

During the isomerization step, from about 25 to about 100 percent of the allyl terminal unsaturation is converted to propenyl terminal unsaturation. The time required for the desired conversion of the allyl terminal unsaturation to propenyl terminal unsaturation will depend on the particular catalyst employed, the concentration of the catalyst, the reaction temperature, whether a continuous or batch process is used and other factors.

In the propenyl terminal unsaturation removal step, diluents such as methanol, ethanol, propanol, etc., may be utilized, if desired. The time required for the removal of the desired amount of the propenyl terminal unsaturation will depend on the particular reaction conditions selected.

In the one-step process a polyether having at least one hydroxyl group and allyl and propenyl terminal unsaturation is contacted with a catalyst comprising a ruthenium compound supported, for example, on a zeolite or silica gel at a temperature of about 20 to about 190° C., and for a period of time ranging from 0.5 to about 24 hours whereby a polyether product essentially free of terminal unsaturation is produced. Useful catalysts include, for example, ruthenium (III) chloride, etc.

In this reaction the isomerization of the allyl terminal unsaturation of the polyether to propenyl terminal unsaturation and the removal of the propenyl terminal unsaturation occurs in a single operation.

In the in-situ process of this invention propylene oxide is reacted at a temperature of about 90 to about 150° C. in the presence of a ruthenium catalyst, such as tris (triphenylphosphine) ruthenium (II) chloride, with a polyoxypropylene glycol initiator having a molecular weight of about 100 to about 1000 and containing about 0.5 to about 10 weight percent of potassium hydroxide, based on the weight of the initiator whereby a polyoxypropylene glycol free of terminal unsaturation is obtained.

The following examples which illustrate the nature of the instant invention are not intended to be limitative.

It may be seen from Examples 2 through 8 that the single isomerization step can convert at least about 97 percent or more of the allyl terminal unsaturation to propenyl terminal unsaturation. In one embodiment of the invention, the single isomerization step can convert at least 90 percent or more of the allyl terminal unsaturation to propenyl terminal unsaturation; in another embodiment of the invention, the conversion is at least 95 percent or more.

For 0.058 M KOH catalyst per liter, the conversions of allylic termination to propenyl termination for various lengths of time at various reaction temperatures may be calculated. The initial allylic termination is 3 mole percent of the total end groups. This information is presented in Table A below, and in graphic form in FIG. 1. The results of Examples 7 and 8 are consistent with these calculations.

TABLE A

Conversions of Allylic Termination to Propenyl Termination

| Time (hrs.) | Temperature (° C.) | | | | |
|---|---|---|---|---|---|
| | 130.0 | 140.0 | 150.0 | 160.0 | 170.0 |
| 0 | 0.0% | 0.0% | 0.0% | 0.0% | 0.0% |
| 1 | 0.6% | 1.7% | 4.6% | 11.4% | 25.8% |
| 5 | 3.0% | 8.4% | 20.9% | 45.4% | 77.5% |
| 10 | 6.0% | 16.0% | 37.5% | 70.2% | 94.9% |
| 20 | 11.6% | 29.5% | 60.9% | 91.1% | 99.7% |
| 50 | 26.5% | 58.2% | 90.5% | 99.8% | 100.0% |
| 100 | 46.0% | 82.5% | 99.1% | 100.0% | 100.0% |
| 500 | 95.4% | 100.0% | 100.0% | 100.0% | 100.0% |
| 1000 | 99.8% | 100.0% | 100.0% | 100.0% | 100.0% |

TABLE A-continued

EXAMPLE 1

Preparation of a Monofunctional Polyether From Allyl Alcohol and Propylene Oxide (Polyether 7059-59)

To 3 lbs. allyl alcohol in a fully cooled nitrogen padded kettle was added 20 g of solid potassium hydroxide which had been ground to a powder. 17.7 lbs. of propylene oxide was added to the allyl alcohol by conventional techniques. The resulting polyether (7059-58) had the following properties:

Hydroxyl no., mg KOH/g 145

Molecular weight, theoretical 387

15lbs. of 7059-58 and 346 g of 45 percent potassium hydroxide were charged to a nitrogen padded kettle and purged with nitrogen 15 minutes. The mixture was then dried with a nitrogen purge at 110° C. to <0.05 percent water. Propylene oxide (60 lbs.) was added to the polyether, following which the reaction mass was neutralized with 302 g of 38 percent lactic acid. NMR analysis indicated that the product had 53 mol percent secondary hydroxyl termination, 39 mol percent allyl termination and 9 mol percent propenyl termination. The resulting polyether (7059-59) had the following properties:

Hydroxyl no., mg. KOH/g 37.1

Molecular weight 1608 as determined by GPC analysis

EXAMPLE 2

Isomerization with Tris (Triphenylphosphine) Ruthenium (II) Chloride Catalyst 12.09 g of polyether of Example 1 (7059-59), 0.12 g DABCO®, a triethylenediamine product of Air Products and Chemicals, Inc., 0.59 g tris (triphenylphosphine) ruthenium (II) chloride and 25 ml of 90 percent ethanol was heated under nitrogen purge at reflux temperature for 24 hours. The catalyst was removed by filtration and the solvent removed in a rotary evaporator. The product was then dissolved in methylene chloride, washed with 50 ml of 1 N hydrochloric acid and then with (2×50 ml) deionized water. The organic layer was separated, dried over sodium sulfate, decolorized with Norit® A, activated carbon of American Norit Co., Inc., filtered and the solvent removed in a rotary evaporator.

NMR analysis of the product (7121-6) showed 62 mol percent hydroxyl termination, 0 mole percent allyl termination, 35 mole percent prope nyl termination and 3 mol percent propyl ether termination. Thus, all of the allyl terminal unsaturation of the polyether 7059-59 was isomerized to propenyl terminal unsaturation.

EXAMPLE 3

Isomerization with Ruthenium Chloride Catalyst 12.4 g of the polyether of Example 1 (7059-59, 39 mol percent allyl termination), 0.17 g DABCO®, 0.16 g ruthenium trichloride and 25 ml of 90 percent methanol was heated under nitrogen purge at reflux temperature for 24 hours. The catalyst was removed by filtration and the solvent removed in a rotary evaporator. The product was dissolved in methylene chloride, washed with 50 ml of 1 N hydrochloric acid and then with (2×50 ml) deionized water. The organic layer was separated, dried over sodium sulfate, decolorized with Norit® A activated carbon, filtered and the solvent removed from the product in a rotary evaporator.

NMR analysis of the product (7121-9) showed 56 mol percent secondary hydroxyl termination, 10 mol percent primary hydroxyl termination, 0 mol percent allyl termination and 34 mol percent propenyl termination. Thus, all of the allyl terminal unsaturation in the starting material was isomerized to propenyl terminal unsaturation. The primary hydroxyl termination was produced as a result of cleavage of propenyl terminal groups.

EXAMPLE 4

Isomerization with Silica Gel Supported Tris (Triphenylphosphine) Ruthenium (II) Chloride Catalyst 2 g of tris (triphenylphosphine) ruthenium (II) chloride was dissolved in 50 ml methylene chloride and the solution added to a mixture of 200 g of 70–250 mesh silica gel slurried in methylene chloride. The methylene chloride was removed in a rotary evaporator to give a silica gel supported catalyst (7121-11). 150 g of the polyether of Example 1 (7059-59) and 32 g of the supported catalyst were combined and heated at 100° C. under nitrogen with stirring for 72 hours.

NMR of the product (7121-11B) showed 56.1 percent secondary hydroxyl termination, 1 mol percent allyl termination and 43 mol percent propenyl termination. Thus, 97 percent of the allyl terminal unsaturation present in the starting polyether (7059-59, 39 mol percent allyl termination) was isomerized to propenyl terminal unsaturation.

EXAMPLE 5

Isomerization with Ruthenium Oxide Hydrate Catalyst 60.74 g of the polyether of Example 1 (7059-59, 39 mol percent allyl termination) and 1.24 g ruthenium oxide hydrate were combined in 100 ml of methanol and refluxed for 72 hours. The reaction mixture was treated with Norit® A activated carbon and filtered over Celite® filter aid, a diatomaceous earth product of Johns-Manville Products Corporation to remove the catalyst.

NMR analysis of the product (7121-17B) showed 54 mol percent secondary hydroxyl termination, 2 mol percent primary hydroxyl termination, 0 mol percent allyl termination and 38 mol percent propenyl termination. Thus, all of the allyl terminal unsaturation was isomerized to propenyl terminal unsaturation.

EXAMPLE 6

Isomerization with Tris (Triphenylphosphine) Rhodium I Chloride 12.56 g of the polyether of Example 1 (39 mol percent allyl termination) and 650 mg tris (triphenyl-phosphine) rhodium (I) chloride were combined in 50 ml methanol and stirred 24 hours at 25° C. The reaction mass was filtered, dissolved in methylene chloride and washed with water. The organic layer was separated, dried over sodium sulfate, filtered and solvent removed in a rotary evaporator.

NMR analysis of the product (7121-20B) showed 43 mol percent secondary hydroxyl termination, 0 mole percent allyl termination, 36 mol percent propenyl termination and 6 mol percent propyl ether termination. Thus, all of the allyl terminal unsaturation of the starting material was either isomerized to propenyl terminal unsaturation or hydrogenated to propyl ether.

EXAMPLE 7

Isomerization with Potassium Hydroxide Catalyst 159.8 g of polyether of Example 1 (39 mol percent allyl unsaturation) and 9.1 g of potassium hydroxide were combined and stirred under argon for 24 hours at 160° C.±5° C. The basic polyether product was then cooled to ambient temperature, neutralized with 1 M aqueous hydrochloric acid and the product was removed from the resulting aqueous layer by liquid/liquid extraction with methylene chloride solvent. The organic phase was dried over sodium sulfate, filtered and the solvent removed from the product in a rotary evaporator.

NMR analysis of the product (7121-22) showed 50 mol percent secondary hydroxyl termination, 25 mol percent primary hydroxyl termination, 0 mol percent allyl termination and 25 mol percent propenyl termination. Thus, all of the allyl terminal unsaturation of the starting polyether was isomerized to propenyl terminal unsaturation. The primary hydroxyl terminated material was formed by partial removal of the propenyl unsaturation during the product recovery steps.

GPC analysis of product 7121-22 indicated a peak molecular weight of 1652, Mn of 1425 and Mw of 1733 while GPC analysis of the starting material 7059-59 indicated a peak molecular weight of 1651, Mn of 1264 and Mw of 1608. These values show that degradation of the polyether did not occur.

EXAMPLE 8

Isomerization with Potassium Hydroxide Catalyst

To 152.29 g of polyether of Example 1 (7059-59, 39 mol percent allyl termination) was added 0.63 g solid potassium hydroxide. The mixture was purged with argon at ambient temperature and then heated to 160° C. for 48 hours with stirring under argon. The product was recovered from the reaction mixture using the same procedure as described in Example 7.

NMR analysis of the product (7121-24) showed 54 mol percent secondary hydroxyl termination, 9 mol percent primary hydroxyl termination, 1 mol percent allyl termination and 36 mol percent propenyl termination. Thus, 97 percent of the allyl terminal unsaturation of the starting polyether was isomerized to propenyl terminal unsaturation. The primary hydroxyl terminated material resulted from hydrolysis of propenyl terminal groups during the product recovery steps.

EXAMPLE 9

Isomerization with Potassium Hydroxide Catalyst

To 151.60 g of polyether 7059-59 was added 0.25 g solid potassium hydroxide. The mixture was purged with argon at 25° C. for 45 minutes and then heated at 160° C. for 72 hours with stirring. The catalyst was extracted from the mixture with aqueous hydrochloric acid following which the mixture was washed with aqueous sodium bicarbonate. The organic layer was separated and dissolved in 100 ml of methylene chloride, dried over sodium sulfate, filtered and the solvent removed from the product in a rotary evaporator.

NMR analysis of the product (7121-28) showed 53 mol percent secondary hydroxyl termination, 17 mol percent allyl termination, 11 mol percent propenyl termination and 19 mol percent primary hydroxy termination. Thus, the allyl terminal unsaturation was reduced from 39 mol percent in the starting polyether to 17 mol percent.

EXAMPLE 10

Isomerization with Cesium Hydroxide Catalyst 150.6 g of polyether of Example 1 (7059-59) and 1.34 g of 50 percent aqueous cesium hydroxide were combined, purged with argon for 30 minutes, heated to 160° C. under argon with stirring for 4 hours 10 minutes.

NMR analysis of the product (7121-44) showed 22 mol percent allyl and 26 mol percent propenyl termination. Thus, the allyl terminal unsaturation in the starting polyether (7059-59) was reduced from 39 mol percent to 22 mol percent.

EXAMPLE 11

Continuous Isomerization Reaction with Magnesium Oxide Catalyst

TEXOX® 2000, a 2000 molecular weight polyoxypropylene glycol sold by the Huntsman Corporation was passed over granular magnesium oxide in a 100 cc reactor at a space velocity of 0.14 cc feed/cc catalyst/hr. and at temperatures of 140, 160, 180 and 200° C. The feed material contained 0.051 meq/g of allyl unsaturation. The effluent streams of these continuous runs were calculated for allyl unsaturation by difference in total unsaturation and propenyl unsaturation and the results are presented in Table I below:

TABLE I

| Allyl Unsaturation Levels After Single Pass Through Reactor | | | | | |
|---|---|---|---|---|---|
| Sample | Space Velocity (cc feed/cc catalyst/hr) | Temp. (° C.) | Total unsaturation (meq/g) | Propenyl Unsaturation (meq/g) | Allyl Unsaturation Level (meq/g) |
| 7121-86-1 | 0.14 | 140 | 0.053 | 0.012 | 0.041 |
| 7121-86-2 | 0.14 | 160 | 0.050 | 0.009 | 0.041 |
| 7121-86-3 | 0.14 | 180 | 0.036 | Not as detected | 0.036 |
| 7121-86-4 | 0.14 | 200 | 0.027 | Not as detected | 0.027 |

These results show both isomerization of the allyl groups to propenyl groups and removal of the propenyl groups by the catalyst.

EXAMPLE 12

Continuous Isomerization Reaction with Hydrotalcite Catalyst

TEXOX® 2000, a 2000 molecular weight polyoxypropylene glycol sold by the Huntsman Corporation was passed over KW-2000, a calcined synthetic hydrotalcite of the Kyowa Chemical Industry Co., Ltd. of Japan, in a 100 cc reactor at a space velocity of 0.14 cc feed/cc catalyst/hr. and at temperatures of 160, 180, 200, 220 and 240° C. The feed material contained 0.050 meq/g of allyl unsaturation. The effluent streams of these continuous runs were analyzed by IR and NMR and the results are presented in Table II below:

TABLE II

| Allyl Unsaturation Levels After Single Pass Through Reactor | | | | | |
|---|---|---|---|---|---|
| Sample | Space Velocity (cc feed/cc catalyst/hr) | Temp. (° C.) | Total unsaturation (meq/g) | Propenyl Unsaturation (meq/g) | Allyl Unsaturation (meq/g) |
| 7121-85-1 | 0.14 | 160 | 0.050 | 0.012 | 0.038 |
| 7121-85-2 | 0.14 | 180 | 0.036 | 0.014 | 0.022 |
| 7121-85-3 | 0.14 | 200 | 0.027 | 0.008 | 0.019 |
| 7121-85-4 | 0.14 | 220 | 0.018 | 0.007 | 0.011 |
| 7121-85-5 | 0.14 | 240 | 0.014 | 0.003 | 0.011 |

These results show both isomerization of the allyl group to propenyl groups and removal of the propenyl groups by the catalyst.

EXAMPLE 13

Preparation of a Polyoxypropylene Glycol with Reduced Allyl Unsaturation 4 lbs. of TEXOX® 400, a polyoxypropylene glycol having a molecular weight of 400 sold by the Huntsman Corporation and 120 g of 45 wt. percent aqueous potassium hydroxide were charged to a nitrogen padded reactor. The TEXOX® 400 was dried to <0.05 wt. percent water and then 16 lbs. of propylene oxide was added semi-continuously at 50 psig reactor pressure and at 150° C. following which the reaction was allowed to continue until the reactor pressure had dropped to ≦5 psig.

NMR analysis of this polyoxypropylene glycol product showed 91.8 mol percent secondary hydroxyl termination, 5.4 mol percent allyl termination and 2.8 mol percent propenyl termination.

The reactor was then heated to 160° C. and the glycol product maintained at that temperature under nitrogen with mixing for 8 hours.

NMR of the final polyoxypropylene glycol product showed 91.2 mol percent secondary hydroxyl termination, <1 mol percent allyl termination and 8.8 mol percent propenyl termination.

EXAMPLE 14

Ally Unsaturation Reduction in a Polyoxypropylene Glycol Product 79.5 lbs. of TEXOX® 2000, a polyoxypropylene glycol of 2000 molecular weight (96 mol percent secondary hydroxyl termination, ≦4 mol percent allyl termination and with no propenyl termination) sold by the Huntsman Corporation and 477 g of 45 percent aqueous potassium hydroxide were charged to a nitrogen padded reactor and dried to <0.05 wt. percent water. The mixture was heated at 160° C. for 8 hours and the catalyst removed with an absorbent.

NMR analysis of the recovered product showed 3.2 mol percent propenyl termination and NMR showed no detectable allyl termination. Thus, all of the allyl terminal unsaturation was isomerized to propenyl terminal unsaturation.

EXAMPLE 15

Batchwise Removal of Propenyl Unsaturation with Acidic Zeolite Catalyst 81.15 g of polyol product 7121-8 (58 mol percent secondary hydroxyl termination, 3 mol percent primary hydroxyl termination, 25 mol percent allyl termination and 15 mol percent propenyl termination), 16.29 g of Valfor CBV 901-X16 Y zeolite of PQ Corp., 5.62 g of water and 50 ml methanol were combined and stirred at 25° C. for 4 hours. The zeolite was removed by filtration and the solvent removed in a rotary evaporator.

NMR analyses of the product 7121-17A showed 54 mol percent secondary hydroxyl termination, 21 mol percent primary hydroxyl termination, 25 mol percent allyl termination, and 0 mol percent propenyl termination. Thus, all of the propenyl terminal unsaturation was removed from the starting material by the zeolite.

EXAMPLE 16

Batchwise Propenyl Unsaturation Removal with Indium (III) Chloride Tetrahydrate Catalyst 51.9 g of the polyether of Example 1 (39 mol percent allyl termination and 9 mol percent propenyl termination) and 0.88 g of indium (III) chloride tetrahydrate were dissolved in 100 ml methanol and refluxed for 72 hours. 100 ml of methylene chloride was added to the reaction mixture and the mixture washed with 2×80 ml water. The resulting organic layer was dried over sodium sulfate, filtered and the solvent removed in a rotary evaporator.

NMR analysis of the product (7121-15A) showed 53 mol percent secondary hydroxyl termination, 9 mol percent primary hydroxyl termination, 38 mol percent allyl termination and 0 mol percent propenyl termination. Thus, all of the propenyl terminal unsaturation of the product was removed from the starting material by the indium (III) chloride tetrahydrate catalyst.

EXAMPLE 17

Continuous Removal of Propenyl Unsaturation

The polyoxypropylene glycol product of Example 13 (0.032 mq/g mol percent propenyl termination) was passed over Valfor CBV 780-X16 Y zeolite catalyst in a 100 cc reactor at space velocities of 0.14, 0.7 and 1.4 g feed/100 cc catalyst/hr. and at temperatures as shown in Table III. The feed material contained 0.039 meq/g unsaturation, at least 0.032 meq/g of which was propenyl unsaturation. The effluent streams of these continuous runs were analyzed by IR and the results are presented in Table III.

TABLE III

Unsaturation Levels (meq/g) After Single Pass Through Reactor

| Sample | Space Velocity cc feed/100 cc Catalyst | Temperature (° C.) | Propenyl Unsaturation Level (meq/g) |
|---|---|---|---|
| 7121-53-5 | 0.14 | 40 | 0.022 |
| 7121-53-4 | 0.14 | 60 | 0.04 |
| 7121-53-3 | 0.14 | 80 | Not detected |
| 7121-53-2 | 0.14 | 100 | Not detected |
| 7121-53-1 | 0.14 | 120 | Not detected |
| 7121-68-1 | 0.7 | 40 | 0.025 |
| 7121-68-2 | 0.7 | 60 | 0.022 |
| 7121-68-3 | 0.7 | 80 | 0.016 |
| 7121-68-4 | 0.7 | 100 | 0.011 |
| 7121-68-5 | 0.7 | 120 | 0.009 |
| 7121-68-6 | 0.7 | 140 | Not detected |
| 7121-68-7 | 0.7 | 160 | Not detected |
| 7121-67-1 | 1.4 | 120 | 0.005 |
| 7121-67-2 | 1.4 | 140 | Not detected |
| 7121-67-3 | 1.4 | 160 | Not detected |

These data indicate that in every case the total unsaturation was reduced.

EXAMPLE 18

One Step Isomerization and Propenyl Unsaturation Removal 5 150 g of 70-230 mesh silica gel was added to 5 g of ruthenium (III) chloride dissolved in 250 ml deionized water and the mixture slurried for 30 minutes. The water was removed in a rotary evaporator to give a silica gel supported catalyst. 100 g of the polyether of Example 1 (39 mol percent allyl termination and 9 mol percent propenyl termination) and 32 g of the silica gel supported catalyst were combined and heated under nitrogen at 110° C. with stirring for 24 hours after which the catalyst was removed by filtration.

NMR analysis of the recovered product showed 54 mol percent secondary hydroxyl termination and 1 mol percent allyl termination. Thus, 97 percent of the allyl terminal unsaturation and 100 percent of the propenyl terminal unsaturation was removed from the starting material in a single batchwise reaction.

EXAMPLE 19

In Situ Preparation of Low Unsaturation Polyoxypropylene Glycol

A nitrogen padded reactor was charged with 4 lbs. TEXOX® 400, a polyoxypropylene glycol containing catalytic potassium hydroxide and having a molecular weight of 400 sold by the Huntsman Corporation, which was dried to <0.05 wt. percent water. 5 g of tris (triphenylphosphine) ruthenium (II) chloride was added to the reactor after which 16 lbs. of propylene oxide was added semi-continuously at 50 psig and 115°. The reaction mass was then treated with an absorbent to remove the catalyst.

NMR analysis of the recovered product 7059-97 showed no detectable allyl or propenyl termination. Only secondary hydroxyl termination was observed.

What is claimed is:

1. A process for preparing a polyether polyol having reduced terminal unsaturation comprising (1) reacting propylene oxide with an initiator having at least two hydroxyl groups in the presence of a basic catalyst at a temperature of about 90 to about 150° C., at least a portion of the resulting polyether polyol product being characterized by having allyl terminal unsaturation, (2) heating the polyether polyol of step (1) containing the basic catalyst at a temperature of about 110 to about 190° C. whereby the allyl terminal unsaturation is reduced by conversion to propenyl terminal unsaturation, where the amount of conversion is at least 90% in a single step (3) removing the basic catalyst from the polyether polyol product of step (2), and (4) contacting the polyether polyol product of step (3) with an acidic zeolite whereby a substantial amount of the propenyl terminal unsaturation is removed and the corresponding polyether polyol is obtained.

2. The process of claim 1 wherein the polyether polyol product of step (1) having allyl terminal unsaturation further contains propenyl terminal unsaturation.

3. The process of claim 1 wherein the initiator is a polyoxypropylene glycol having a molecular weight of about 200 to about 1000.

4. The process of claim 1 wherein the initiator is a polyoxypropylene glycol having a molecular weight of 400.

5. The process of claim 1 wherein the basic catalyst of step (1) is selected from the group consisting of cesium, sodium and potassium hydroxide.

6. The process of claim 1 wherein the basic catalyst is potassium hydroxide.

7. The process of claim 1 wherein the catalyst in step (1) is present in an amount of about 0.5 to about 10 weight percent based on the weight of the initiator.

8. The process of claim 1 wherein in step (1) the catalyst is potassium hydroxide and the initiator is a polyoxypropylene glycol having a molecular weight of about 200 to about 600.

9. The process of claim 1 wherein in step (2) the polyether polyol product containing the basic catalyst is heated for about 0.5 to about 24 hours.

10. The process of claim 1 wherein the acidic zeolite in step (4) is present in an amount of about 0.2 to about 25 weight percent based on the weight of the polyether polyol product of step (3).

11. The process of claim 1 where in step 4 the polyether polyol product of step (3) is contacted in a continuous manner with the acidic zeolite.

* * * * *